(12) United States Patent
Kim et al.

(10) Patent No.: US 11,829,527 B2
(45) Date of Patent: Nov. 28, 2023

(54) AUGMENTED REALITY DEVICE, ELECTRONIC DEVICE INTERACTING WITH AUGMENTED REALITY DEVICE, AND CONTROLLING METHOD THEREOF

(71) Applicant: Samsung Electronics Co., Ltd., Gyeonggi-do (KR)

(72) Inventors: Kyunghwa Kim, Gyeonggi-do (KR); Ilku Chang, Gyeonggi-do (KR); Yeojin Kim, Gyeonggi-do (KR); Giyoung Shin, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 70 days.

(21) Appl. No.: 17/538,144

(22) Filed: Nov. 30, 2021

(65) Prior Publication Data

US 2022/0171455 A1 Jun. 2, 2022

Related U.S. Application Data

(63) Continuation of application No. PCT/KR2021/017866, filed on Nov. 30, 2021.

(30) Foreign Application Priority Data

Nov. 30, 2020 (KR) .................. 10-2020-0164402

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G02B 27/0101* (2013.01);
(Continued)

(58) Field of Classification Search
CPC ............ G02B 27/0093; G02B 27/0101; G02B 27/017; G02B 27/0172; G02B 2027/0138;
(Continued)

(56) References Cited

U.S. PATENT DOCUMENTS 10,592,104 B1 3/2020 Steptoe et al.
10,802,582 B1 10/2020 Clements
(Continued)

FOREIGN PATENT DOCUMENTS

JP 6361714 7/2018
KR 1020140052263 5/2014
(Continued)

OTHER PUBLICATIONS

International Search Report dated Mar. 2, 2022 issued in counterpart application No. PCT/KR2021/017866, 12 pages.

*Primary Examiner* — Nitin Patel
*Assistant Examiner* — Cory A Almeida
(74) *Attorney, Agent, or Firm* — The Farrell Law Firm, P.C.

(57) ABSTRACT

Methods and devices are provided in which a first screen is displayed on a first display of the first electronic device. An image of an eye of a user of the first electronic device is obtained. A first object in the first screen corresponding to a gaze direction of the user is identified based on the image of the eye of the user. An input interface is displayed on a second display of the second electronic device based on a type of the first object. A second screen that is different from the first screen is displayed on the first display of the first electronic device, based on a first input obtained through the input interface.

20 Claims, 15 Drawing Sheets

(51) Int. Cl.
*G06V 20/20* (2022.01)
*G06F 3/0354* (2013.01)
*G02B 27/01* (2006.01)
*G06F 3/04883* (2022.01)

(52) U.S. Cl.
CPC ....... *G02B 27/017* (2013.01); *G06F 3/03547* (2013.01); *G06F 3/04883* (2013.01); *G06V 20/20* (2022.01); *G02B 2027/014* (2013.01); *G02B 2027/0138* (2013.01)

(58) Field of Classification Search
CPC ...... G02B 2027/014; G02B 2027/0178; G02B 2027/0187; G06F 3/013; G06F 3/03547; G06F 3/04883; G06V 20/20; G06V 40/19
See application file for complete search history.

(56) References Cited

U.S. PATENT DOCUMENTS

| | | | |
|---|---|---|---|
| 2012/0212414 A1 | 8/2012 | Osterhout et al. | |
| 2012/0262582 A1* | 10/2012 | Kimchi | H04M 1/72454 |
| | | | 348/E7.085 |
| 2014/0317242 A1* | 10/2014 | Koo | H04W 76/14 |
| | | | 709/219 |
| 2015/0324645 A1 | 11/2015 | Jang et al. | |
| 2015/0346816 A1 | 12/2015 | Lee | |
| 2016/0217617 A1* | 7/2016 | Barribeau | G06F 3/1268 |
| 2017/0115839 A1* | 4/2017 | Park | G06T 19/006 |
| 2017/0322623 A1 | 11/2017 | McKenzie et al. | |
| 2017/0336882 A1 | 11/2017 | Tome et al. | |
| 2019/0004683 A1 | 1/2019 | Pahud et al. | |
| 2019/0056813 A1 | 2/2019 | Fukuda et al. | |
| 2019/0095072 A1 | 3/2019 | Du | |
| 2019/0179423 A1 | 6/2019 | Rose et al. | |

FOREIGN PATENT DOCUMENTS

| | | |
|---|---|---|
| KR | 1020150081846 | 7/2015 |
| KR | 1020150129546 | 11/2015 |
| KR | 1020160001229 | 1/2016 |
| KR | 1020170046415 | 5/2017 |
| KR | 1020190006553 | 1/2019 |

* cited by examiner

AUGMENTED REALITY DEVICE, ELECTRONIC DEVICE INTERACTING WITH AUGMENTED REALITY DEVICE, AND CONTROLLING METHOD THEREOF

CROSS-REFERENCE TO RELATED APPLICATION(S)

This application is a bypass continuation application, claiming priority under § 365(c) to International Application No. PCT/KR2021/017866, filed on Nov. 30, 2021, which is based on and claims priority to Korean Patent Application Serial No. 10-2020-0164402, filed on Nov. 30, 2020 in the Korean Intellectual Property Office, the disclosures of each of which is incorporated herein by reference in its entirety.

BACKGROUND

1. Field

The disclosure relates generally to devices providing augmented reality (AR), and more particularly, to an AR device, an electronic device interacting with the AR device, and a controlling method thereof.

2. Description of Related Art

AR is a technology that superimposes a three-dimensional (3D) image (or two-dimensional (2D) image) on a real image or a background in order to display a single image. AR technology mixes a real environment with a virtual object and enables a user to view the real environment, thereby providing a better sense of reality and additional information.

In an AR device, an image provided through a projector may be incident on an input grating surface through a prism. A user may then see an image passing through an output grating surface. The user may observe the image together with a real environment. For example, the user may identify information about an object in the currently observed environment.

The AR device may identify which object the user is seeing through eye tracking. The AR device may also detect a user's hand gesture using a camera. When the user makes a hand gesture while looking at a specific object, the AR device may identify the user's hand gesture as an input for the specific object through eye tracking and hand gesture detection.

An AR device has limitations in eye tracking accuracy. Particularly, when the size of an object viewed by the user is relatively small or a plurality of other objects are distributed around the object viewed by the user, the accuracy of eye tracking may be decreased.

To compensate for low accuracy in eye tracking, the AR device may be used in connection with an auxiliary input device such as, for example, a joystick or a trackpad. Since a variety of objects are displayable in the AR device, the auxiliary input device needs to identify various inputs related to objects. However, the diversity of input interface configurations for the auxiliary input device is limited due to the limited size of the auxiliary input device.

SUMMARY

An AR device may transmit information related to an object corresponding to a gaze direction of a user, to an external electronic device, and the external electronic device may display an input interface based on the information related to the object.

According to an aspect of the disclosure, an electronic device is provided that includes a display, at least one camera, a communication circuit, and at least one processor. The at least one processor is configured to display a first screen on the display, obtain an image of an eye of a user of the electronic device through the at least one camera, and identify a first object in the first screen corresponding to a gaze direction of the user based on the image of the eye of the user. The at least one processor is also configured to transmit information related to the first object to an external electronic device through the communication circuit. The external electronic device is configured to display an input interface based on the information related to the first object. The at least one processor is further configured to receive, from the external electronic device through the communication circuit, information about an input obtained through the input interface, and display, on the display, a second screen that is different from the first screen, based on the information about the input.

According to an aspect of the disclosure, an electronic device is provided that includes a display, a communication circuit, and at least one processor. The at least one processor is configured to receive, from an external electronic device through the communication circuit, first information related to a first object corresponding to a gaze direction of a user of an external electronic device, in a first screen displayed on the external electronic device. The at least one processor is also configured to display, on the display, an input interface based on the information related to the first object, obtain an input through the input interface, and transmit second information about the input to the external electronic device.

According to an aspect of the disclosure, a method of controlling a first electronic device and a second electronic device is provided. A first screen is displayed on a first display of the first electronic device. An image of an eye of a user of the first electronic device is obtained. A first object in the first screen corresponding to a gaze direction of the user is identified based on the image of the eye of the user. An input interface is displayed on a second display of the second electronic device based on a type of the first object. A second screen that is different from the first screen is displayed on the first display of the first electronic device, based on a first input obtained through the input interface.

An AR device, an electronic device interacting with the AR device, and a controlling method thereof are provided. The AR device transmits information related to an object corresponding to a gaze direction of a user of the AR device, to an external electronic device. The external electronic device displays an input interface based on the information related to the object. Since the input interface is flexibly configured based on information related to the object, the external electronic device may use various input interfaces within a limited device size, and the AR device according to an embodiment may identify an input with high accuracy by an input interface of the external electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
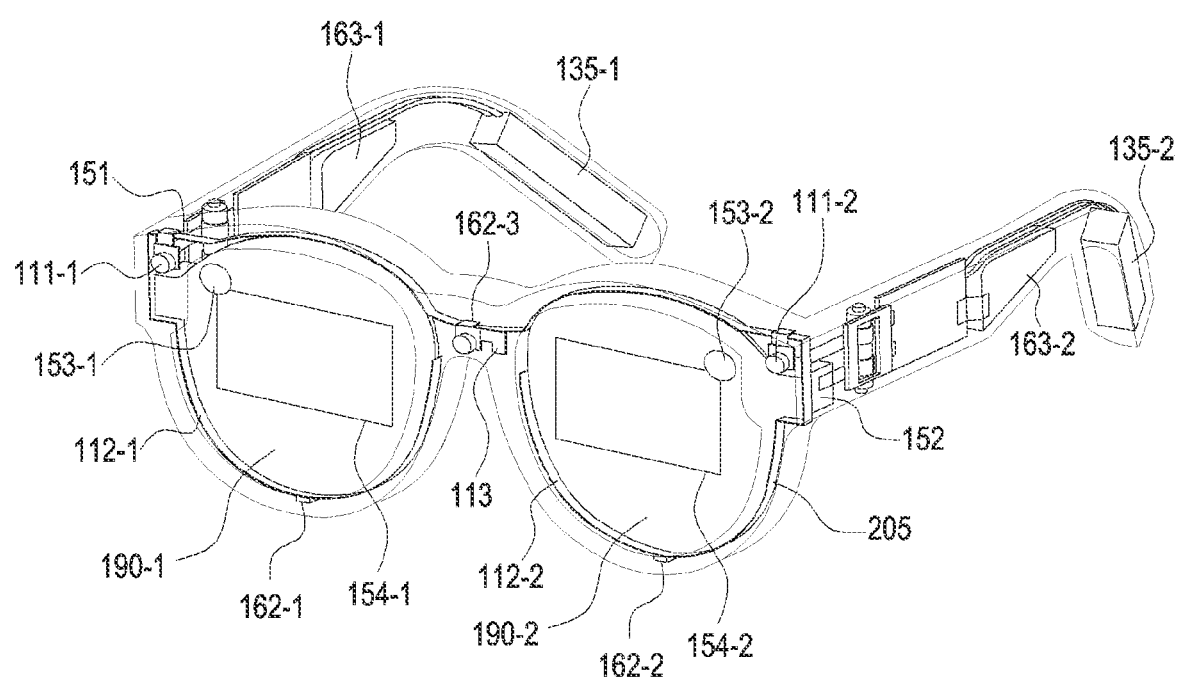
FIG. 1 is a diagram illustrating a structure of an AR device, according to an embodiment.

Embodiments are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure. The embodiments and the terms used therein are not intended to limit the technology disclosed herein to specific forms, and should be understood to include various modifications, equivalents, and/or alternatives to the corresponding embodiments. A singular expression may include a plural expression unless they are definitely different in a context.

FIG. 1 is a diagram illustrating a structure of an AR device, according to an embodiment. The AR device includes one or more first cameras 111-1 and 111-2, one or more second cameras 112-1 and 112-2, and one or more third cameras 113. Images obtained through the one or more first cameras 111-1 and 111-2 may be used for detection of a hand gesture made by a user, tracking of a user's head, and space recognition. The one or more first cameras 111-1 and 111-2 may be global shutter (GS) cameras. The one or more first cameras 111-1 and 111-2 may perform a seamless localization and mapping (SLAM) operation through depth photography. Images obtained through the one or more second cameras 112-1 and 112-2 may be used to detect and track a user's pupils. The one or more second cameras 112-1 and 112-2 may be GS cameras. The one or more second cameras 112-1 and 112-2 may have the same performance. The one or more third cameras 113 may be high-resolution cameras. The one or more third cameras 113 may perform an auto-focusing (AF) function and a tremor correction function. The one or more third cameras 113 may be GS cameras or rolling shutter (RS) cameras.

The AR device includes batteries 135-1 and 135-2. The batteries 135-1 and 135-2 may store power for operating the other components of the AR device.

The AR device includes a first display 151, a second display 152, one or more input optical members 153-1 and 153-2, one or more transparent members 190-1 and 190-2, and one or more screen display parts 154-1 and 154-2. The first display 151 and the second display 152 may include, for example, a liquid crystal displays (LCD), a digital mirror device (DMD), a liquid crystal on silicon (LCoS) display, an organic light emitting diode (OLED) display, or a micro light emitting diode (micro LED) display. When each of the first display 151 and the second display 152 is at least one of an LCD display, a DMD, or an LCoS display, the AR device may include a light source for irradiating light to a screen output area of the display. When the first display 151 and the second display 152 are capable of autonomously generating light, for example, when each of the first display 151 and the second display 152 is one of an OLED display or a micro LED display, the AR device may provide a virtual image of good quality to the user, even though the display does not include a separate light source.

The one or more transparent members 190-1 and 190-2 may be disposed to face the eyes of the user when the user wears the AR device. When the user wears the AR device, the user may view an external world through the one or more transparent members 190-1 and 190-2. The one or more input optical members 153-1 and 153-2 may induce light generated by the first display 151 and the second display 152 to the eyes of the user. Images may be formed on the one or more screen display parts 154-1 and 154-2 of the one or more transparent members 190-1 and 190-2 based on light generated by the first display 151 and the second display 152, and the user may view the images formed on the one or more screen display parts 154-1 and 154-2.

The AR device includes one or more voice input devices 162-1 and 162-2 and one or more voice output devices 163-1 and 163-2.

Figure 2:
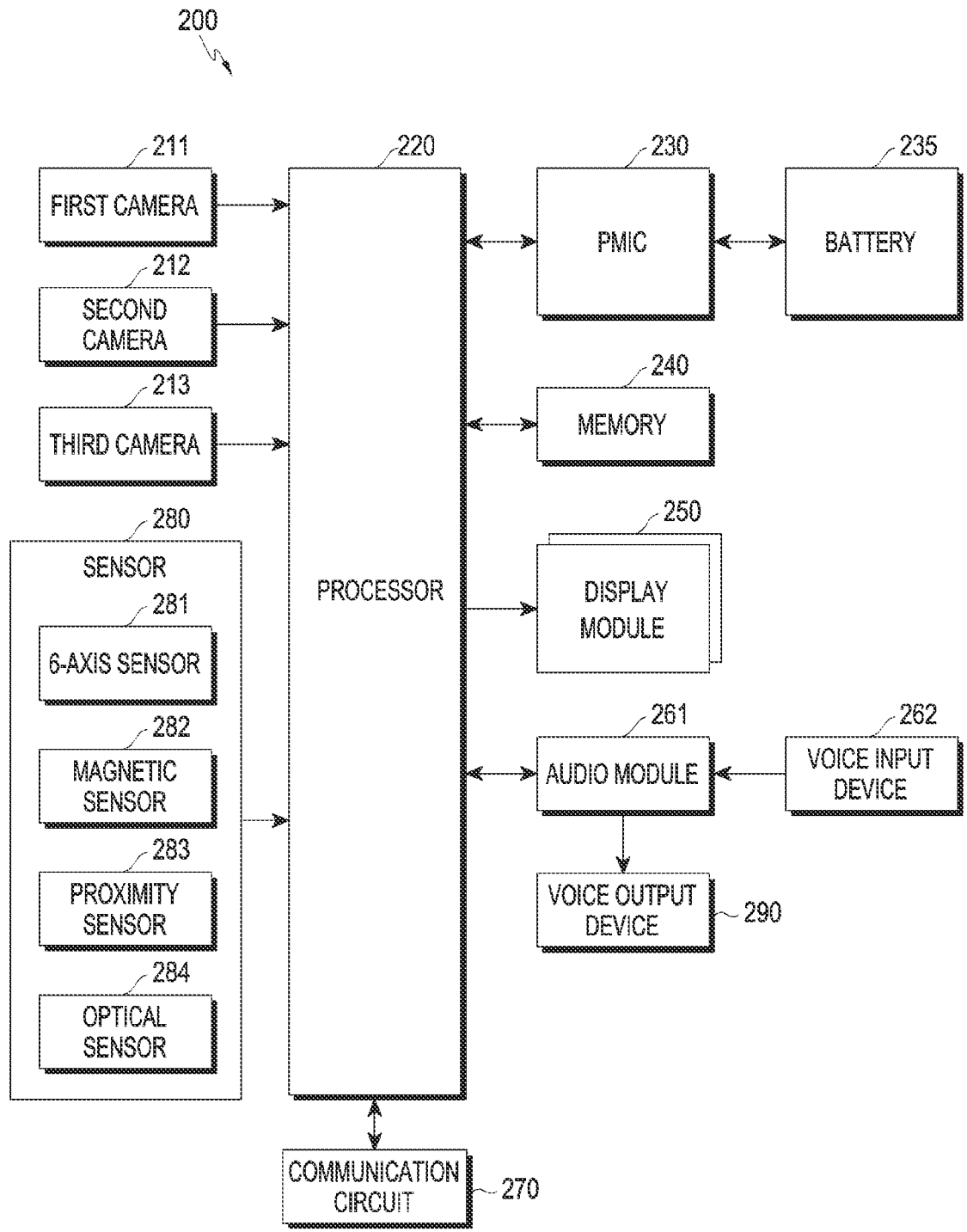
FIG. 2 is a block diagram illustrating an AR device, according to an embodiment.

FIG. 2 is a block diagram illustrating an AR device, according to an embodiment. An AR device 200 includes a first camera 211, a second camera 212, a third camera 213, a processor 220, a power management integrated circuit (PMIC) 230, a battery 235, a memory 240, a display module 250, an audio module 261, a voice input device 262, a voice output device 290, a communication circuit 270, and a sensor 280.

Details of the one or more first cameras 111-1 and 111-2, the one or more second cameras 112-1 and 112-2, and the one or more third cameras 113 described above with reference to FIG. 1 may also be applied to the first camera 211, the second camera 212, and the third camera 213. The AR device 200 may include a plurality of first cameras 211, a plurality of second cameras 212, and/or a plurality of third cameras 213.

The processor 220 may control the other components of the AR device 200, such as, for example, the first camera 211, the second camera 212, the third camera 213, the PMIC 230, the memory 240, the display module 250, the audio module 261, the communication circuit 270, and the sensor 280. The processor 220 may perform various data processes or operations.

The PMIC 230 may convert power stored in the battery 235 to have a current or voltage required for the other components of the AR device 200, and may supply the converted power to the other components of the AR device 200.

The memory 240 may store various data used for at least one component (e.g., the processor 220 or the sensor 280) of the AR device 200.

The display module 250 may display a screen to be provided to the user. The display module 250 may include the first display 151, the second display 152, the one or more input optical members 153-1 and 153-2, the one or more transparent members 190-1 and 190-2, and the one or more screen display parts 154-1 and 154-2.

The audio module 261 may be coupled to the voice input device 262 and the voice output device 290, convert data input through the voice input device 262, and convert data to be output to the voice output device 290.

The communication circuit 270 may support establishment of a wireless communication channel with an electronic device outside the AR device 200 and communication on the established communication channel.

The sensor 280 includes a 6-axis sensor 281, a magnetic sensor 282, a proximity sensor 283, and an optical sensor 284.

Figure 3:
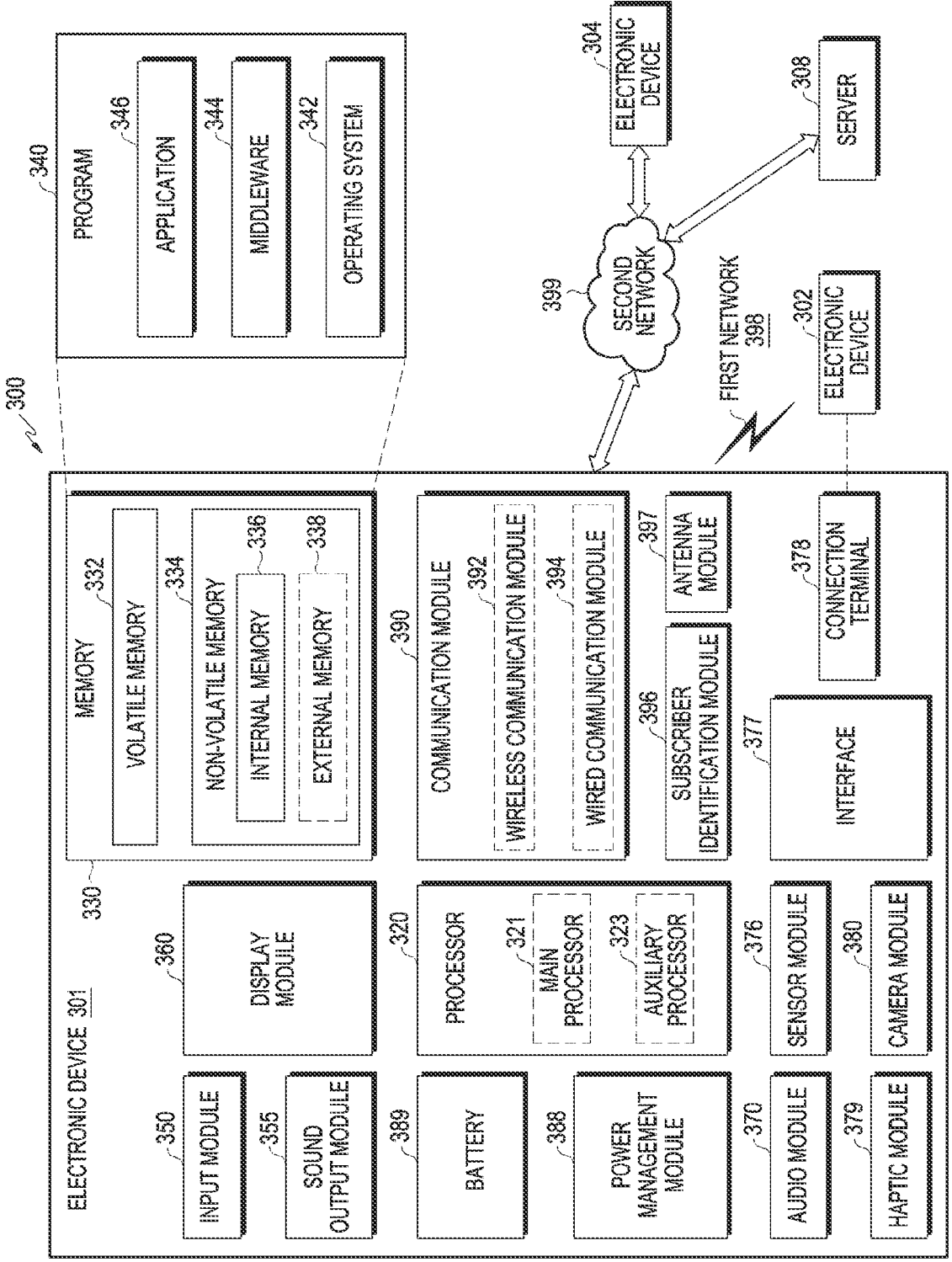
FIG. 3 is a block diagram illustrating an electronic device in a network environment, according to an embodiment.

FIG. 3 is a block diagram illustrating an electronic device in a network environment, according to an embodiment. Referring to FIG. 3, an electronic device 301 in a network environment 300 may communicate with an electronic device 302 via a first network 398 (e.g., a short-range wireless communication network), or at least one of an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input module 350, a sound output module 355, a display module 360, an audio module 370, a sensor module 376, an interface 377, a connecting terminal 378, a haptic module 379, a camera module 380, a power management module 388, a battery 389, a communication module 390, a subscriber identification module (SIM) 396, or an antenna module 397. In some embodiments, at least one of the components (e.g., the connecting terminal 378) may be omitted from the electronic device 301, or one or more other components may be added in the electronic device 301. In some embodiments, some of the components (e.g., the sensor module 376, the camera module 380, or the antenna module 397) may be implemented as a single component (e.g., the display module 360).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323. According to an embodiment, the auxiliary processor 323 (e.g., the neural processing unit) may include a hardware structure specified for artificial intelligence model processing. An artificial intelligence model may be generated by machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input module 350 may receive a command or data to be used by another component (e.g., the processor 320) of the electronic device 301, from the outside (e.g., a user) of the electronic device 301. The input module 350 may include, for example, a microphone, a mouse, a keyboard, a key (e.g., a button), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to an embodiment, the display module 360 may include a touch sensor adapted to detect a touch, or a pressure sensor adapted to measure the intensity of force incurred by the touch.

The audio module 370 may convert a sound into an electrical signal and vice versa. According to an embodiment, the audio module 370 may obtain the sound via the input module 350, or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 392 may support various requirements specified in the electronic device 301, an external electronic device (e.g., the electronic device 304), or a network system (e.g., the second network 399). According to an embodiment, the wireless communication module 392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., a printed circuit board (PCB)). According to an embodiment, the antenna module 397 may include a plurality of antennas (e.g., array antennas). In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

According to various embodiments, the antenna module 397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 or 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra low-latency services using, e.g., distributed computing or mobile edge computing. In another embodiment, the external electronic device 304 may include an internet-of-things (IoT) device. The server 308 may be an intelligent server using machine learning and/or a neural network. According to an embodiment, the external electronic device 304 or the server 308 may be included in the second network 399. The electronic device 301 may be applied to intelligent services (e.g., smart home, smart city, smart car, or healthcare) based on 5G communication technology or IoT-related technology.

Figure 4:
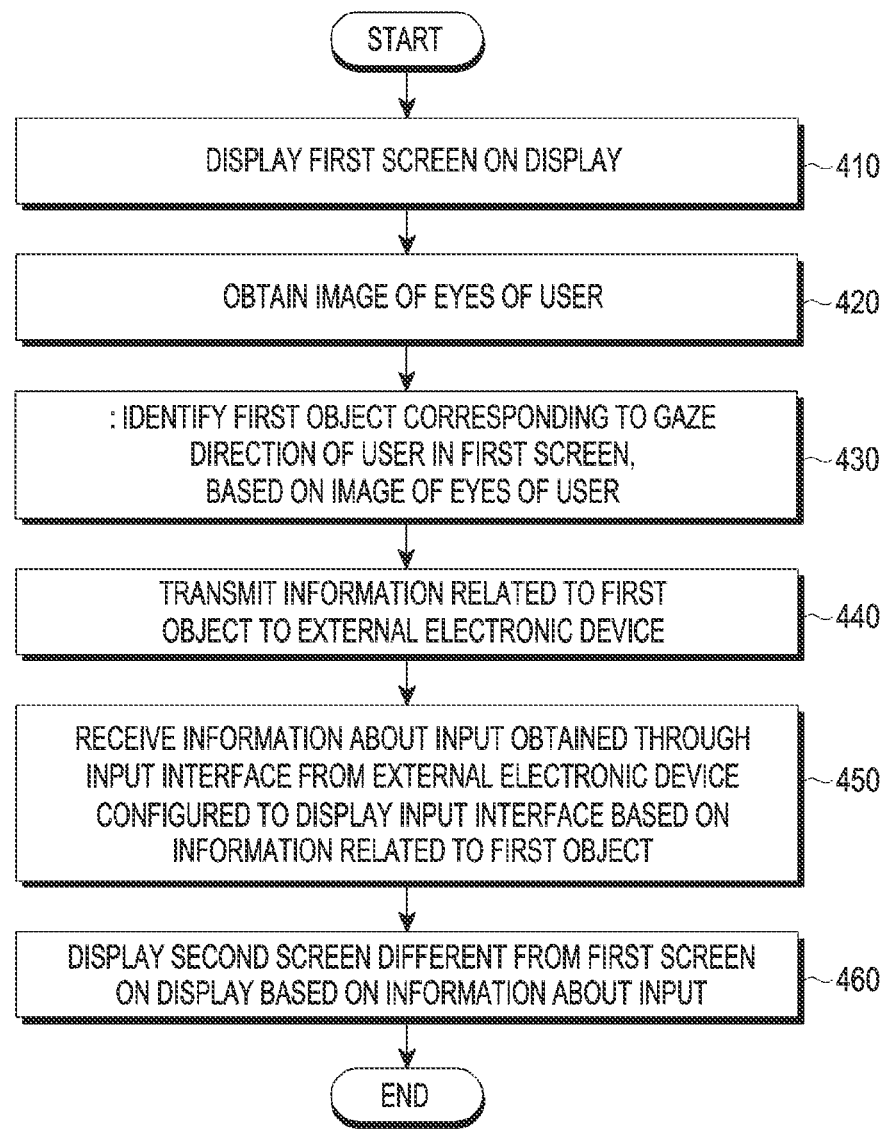
FIG. 4 is a flowchart illustrating operations performed by an AR device, according to an embodiment.

FIG. 4 is a flowchart illustrating operations performed by an AR device, according to an embodiment. With reference to FIGS. 1, 2, and 3, processor 220 of the AR device 200 displays a first screen on a display 250, at 410. The first screen may be an execution screen of an application running on the processor 220. Alternatively, the first screen may be an execution screen of an application running in an external electronic device, which is wirelessly communicating with the AR device 200.

The processor 220 may display a plurality of screens including the first screen. When the plurality of screens are displayed on the display module 250, at least one part of the plurality of screens may include execution screens of applications running on the processor 220, and at least another part of the plurality of screens may include execution screens of applications running in the external electronic device, which is wirelessly communicating with the AR device 200.

At 420, the processor 220 of the AR device 200 obtains an image of the eyes of a user through at least one camera (e.g., the second camera 212).

At 430, the processor 220 of the AR device 200 identifies a first object corresponding to a gaze direction of the user in the first screen based on the obtained image of the eyes of the user.

At 440, the processor 220 of the AR device 200 transmits information related to the identified first object to the external electronic device. The information related to the first object may indicate the coordinates of the first object in the first screen. The information related to the first object may indicate the type of an input interface corresponding to the first object. When the first screen is an execution screen of an application running on the processor 220, the information related to the first object may indicate the type of the input interface corresponding to the first object. When the first screen is an execution screen of an application running in the external electronic device, the information related to the first object may indicate the coordinates of the first object in the first screen.

At 450, the processor 220 of the AR device 200 receives information about an input obtained through an input interface of the external electronic device from the external electronic device through a communication circuit 270. The external electronic device may display the input interface on a display 160 of the external electronic device based on the information related to the first object received from the AR device 200. Various examples of the first object and the input interface are described in greater detail below with reference to FIGS. 5A to 9.

The information about the input may be information about a user input to the input interface of the external electronic device. The user input may include at least one of a drag input, a short touch input, or a long touch input. The information about the input may indicate a position at which the input has been applied in the input interface. The information about the input may indicate a position in the first screen, corresponding to the position at which the input has been applied in the input interface. The information about the input may indicate information about a second screen different from the first screen, which is to be displayed by an application displayed on the first screen based on the user input.

At 460, the processor 220 of the AR device 200 displays the second screen, which is different from the first screen, on the display 250 based on the received information about the input. The processor 220 may display the second screen at a position at which the first screen was displayed without displaying the first screen. The second screen may be a screen that the application of the first screen displays in response to the received input.

In configuring the second screen at 460, the processor 220 of the AR device 200 may receive information obtained through a sensor (e.g., the sensor module 376 of FIG. 3) of the external electronic device from the external electronic device, configure the second screen based on the information obtained through the sensor 376, and display the second screen on the display 250. For example, the processor 220 of the AR device 200 may receive acceleration data obtained through an acceleration sensor included in the external electronic device through the communication circuit 270, configure the second screen based on the acceleration data, and display the second screen on the display 250. The processor 220 of the AR device 200 may receive an image obtained through a camera (e.g., the camera module 380 of FIG. 3) included in the external electronic device through the communication circuit 270, configure the second screen based on the received image, and display the second screen on the display 250.

Figure 5A:
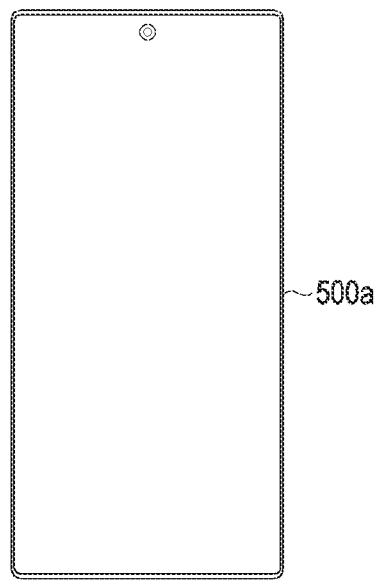
FIG. 5A is a diagram illustrating an input interface, according to an embodiment.

FIG. 5A is a diagram illustrating an input interface, according to an embodiment. Referring to FIG. 5A, at least a partial area of a display 500a of the external electronic device may include a trackpad input interface. The AR device 200 may receive information about a user input applied on a trackpad input interface through the communication circuit 270 and identify the user input based on the received information. The AR device 200 may display a pointer on the display module 250 based on a user drag input on the trackpad input interface, and identify an input that selects an object indicated by the pointer based on a user touch input on the trackpad input interface.

Figure 5B:
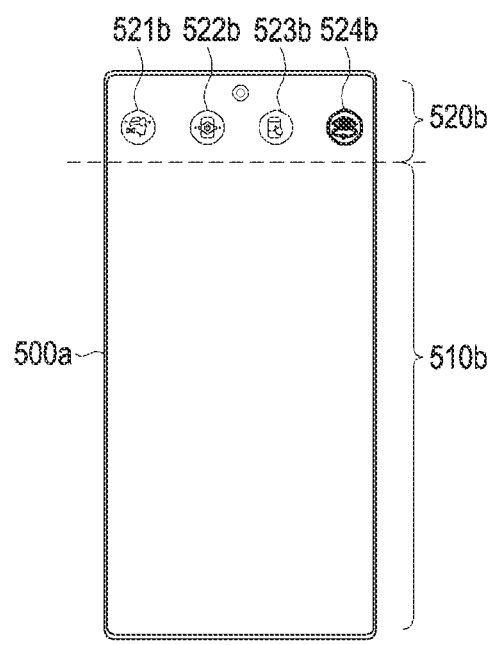
FIG. 5B is a diagram illustrating an input interface, according to an embodiment.

FIG. 5B is a diagram illustrating an input interface, according to an embodiment. Referring to FIG. 5B, a first partial area of a display 500a of the external electronic device may include a trackpad input interface 510b. A second partial area of the display 500a may include a setting change interface 520b. The setting change interface 520b may include an interface for changing a setting related to an operation of the AR device 200. The setting change interface 520b includes a recalibration interface 521b indicating recalibration of the AR device 200, a connection interface 523b indicating connection and disconnection between the AR device 200 and the external electronic device, and a gaze tracking interface 524b indicating discontinuation or resumption of gaze tracking of the AR device 200. The setting change interface 520b also includes a keypad switching interface 522b indicating switching between a display of a keypad input interface on at least a partial area of the display 500a of the external electronic device and display of a keypad interface on the display 250 of the AR device 200.

Figure 6A:
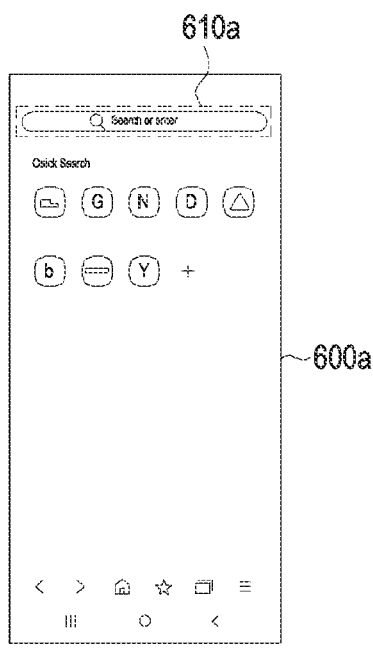
FIG. 6A is a diagram illustrating a screen including an object corresponding to an input interface, according to an embodiment.

FIG. 6A is a diagram illustrating a screen including an object corresponding to an input interface, according to an embodiment. The user may select a field 610a prompting a text input on a screen 600a displayed on the display 250 of the AR device 200.

Figure 6B:
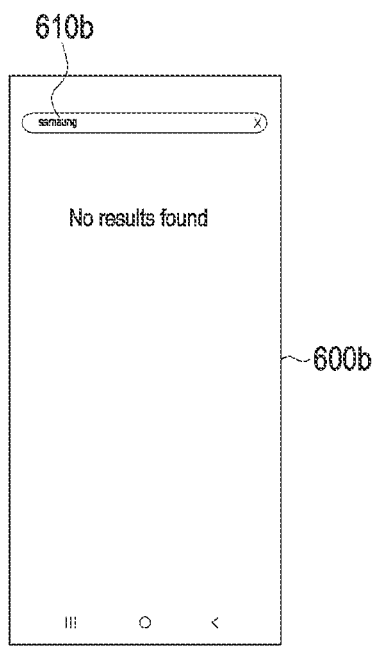
FIG. 6B is a diagram illustrating a screen including an object corresponding to an input interface, according to an embodiment.

FIG. 6B is a diagram illustrating a screen including an object corresponding to an input interface, according to an embodiment. The screen 600a of FIG. 6A may be switched to a screen 600b of FIG. 6B in response to a user selection of the object 610a related to text input on the screen 600a of FIG. 6A. Referring to FIG. 6B, a text input field 610b is displayed on the screen 600b, and text input applied through a keypad input interface (620c of FIG. 6C) may be displayed in the text input field 610b.

Figure 6C:
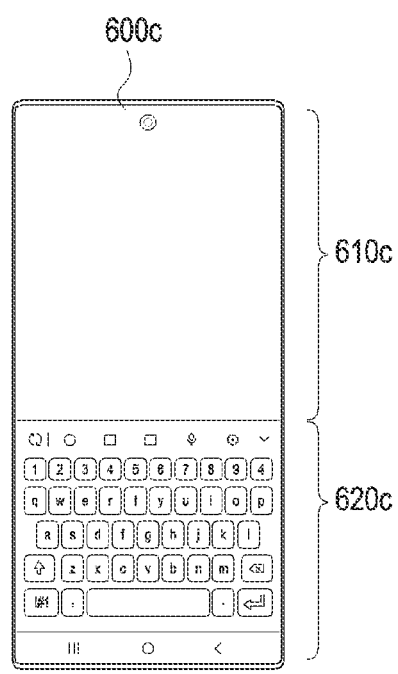
FIG. 6C is a diagram illustrating an input interface, according to an embodiment.

FIG. 6C is a diagram illustrating an input interface, according to an embodiment. A screen 600c including an input interface is displayed on the display 160 of the external electronic device coupled to the AR device 200 in response to the user selection of the object 610a related to a text input in FIG. 6A. A trackpad input interface 610c is displayed in a first partial area of the screen 600c. The keypad input interface 620c is displayed in a second partial area of the screen 600c.

Figure 7A:
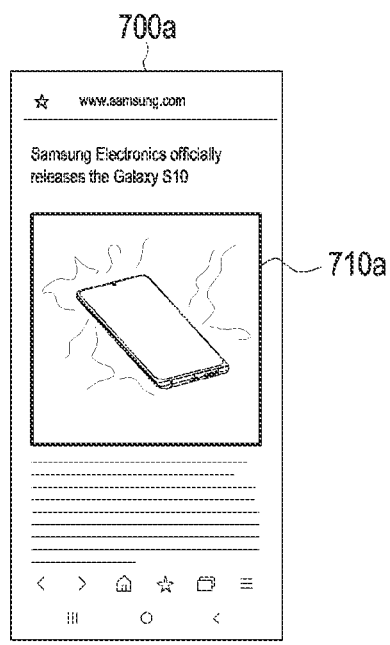
FIG. 7A is a diagram illustrating a screen including an object corresponding to an input interface, according to an embodiment.

FIG. 7A is a diagram illustrating a screen including an object corresponding to an input interface, according to an embodiment. The user may select an image object 710a on a screen 700a displayed on the display 250 of the AR device 200.

Figure 7B:
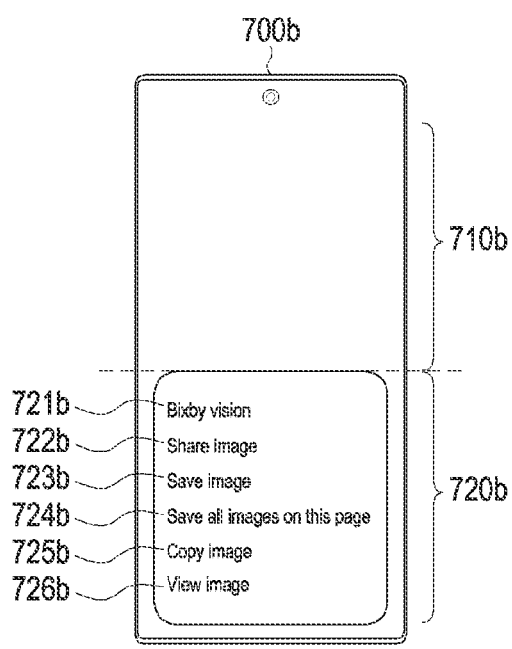
FIG. 7B is a diagram illustrating an input interface, according to an embodiment.

FIG. 7B is a diagram illustrating an input interface, according to an embodiment. A screen 700b is displayed on the display 160 of the external electronic device in response to a user selection of the image object 710a on the screen 700a of FIG. 7A. A trackpad input interface 710b is displayed in a first partial area of the screen 700b. An option input interface 720b with a plurality of options related to the selected image object 710a is displayed in a second partial area of the screen 700b. The option input interface 720b related to the image object 710a includes a plurality of options, including Bixby vision 721b, share image 722b, save image 723b, save all images on this page 724b, copy image 725b, and view image 726b.

Those skilled in the art will understand that a user-selected object being an image and an option input interface including options related to the selected image are merely examples, and various types of objects may cause display of the option input interface, and the content of options included in the option input interface is not limited to those shown in FIG. 7B.

Figure 8A:
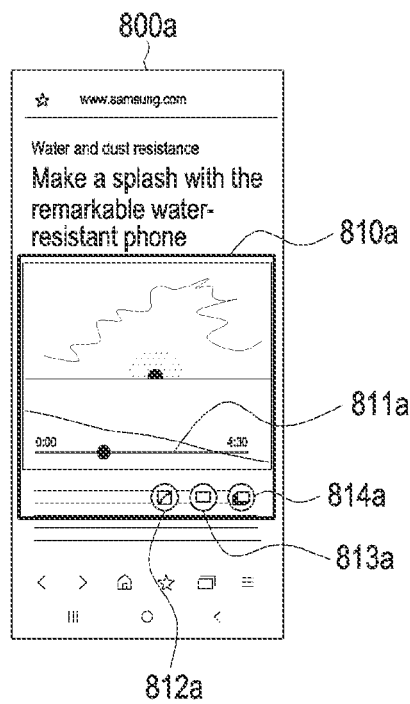
FIG. 8A is a diagram illustrating a screen including an object corresponding to an input interface, according to an embodiment.

FIG. 8A is a diagram illustrating a screen including an object corresponding to an input interface, according to an embodiment. The user may select a video object 810a on a screen 800a displayed on the display 250 of the AR device 200. The video object 810a includes an indicator 811a for adjusting a video play time, and interfaces 812a, 813a, and 814a for settings related to video play.

Figure 8B:
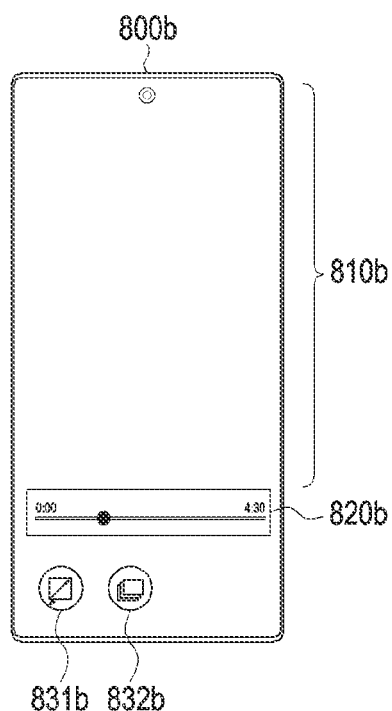
FIG. 8B is a diagram illustrating an input interface, according to an embodiment.

FIG. 8B is a diagram illustrating an input interface, according to an embodiment. A screen 800b is displayed on the display 160 of the external electronic device coupled to the AR device 200 in response to a user selection of the video object 810a on the screen 800a of FIG. 8A. A trackpad input interface 810b is displayed in a first partial area of the screen 800b. Option input interfaces 831b and 832b with options related to the selected video object 810a are displayed in a second partial area of the screen 800b. An indicator 820b for adjusting the play time of the video object 810a is displayed in a partial area of the screen 800b.

Those skilled in the art will understand that a user-selected object being a video and the indicator 820b for adjusting the play time of the video object 810a being displayed on the display 160 of the external electronic device are merely examples, an indicator indicating one of a plurality of numbers or amounts related to various types of selected objects in response to selection of the various types of objects may be displayed as at least a part of an input interface, and an object indicated by the indicator is not limited to the play time of a video.

Figure 9:
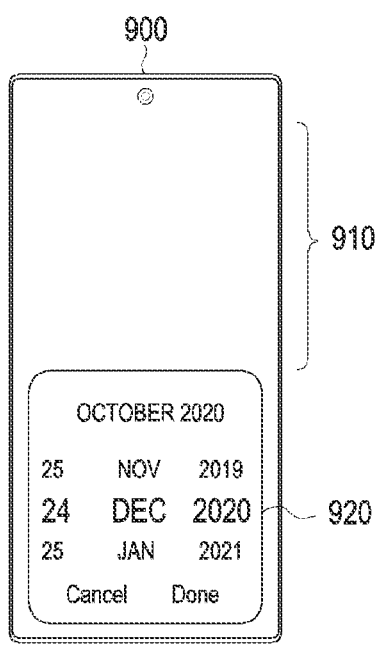
FIG. 9 is a diagram illustrating an interface, according to an embodiment.

FIG. 9 is a diagram illustrating an input interface, according to an embodiment. A trackpad input interface 910 is displayed in a first partial area of a screen 900. A scroll input interface 920 for selecting a date is displayed in a second partial area of the screen 900. The external electronic device (may identify a user input based on at least one of a user flick or drag on the scroll input interface 920.

Figure 10:
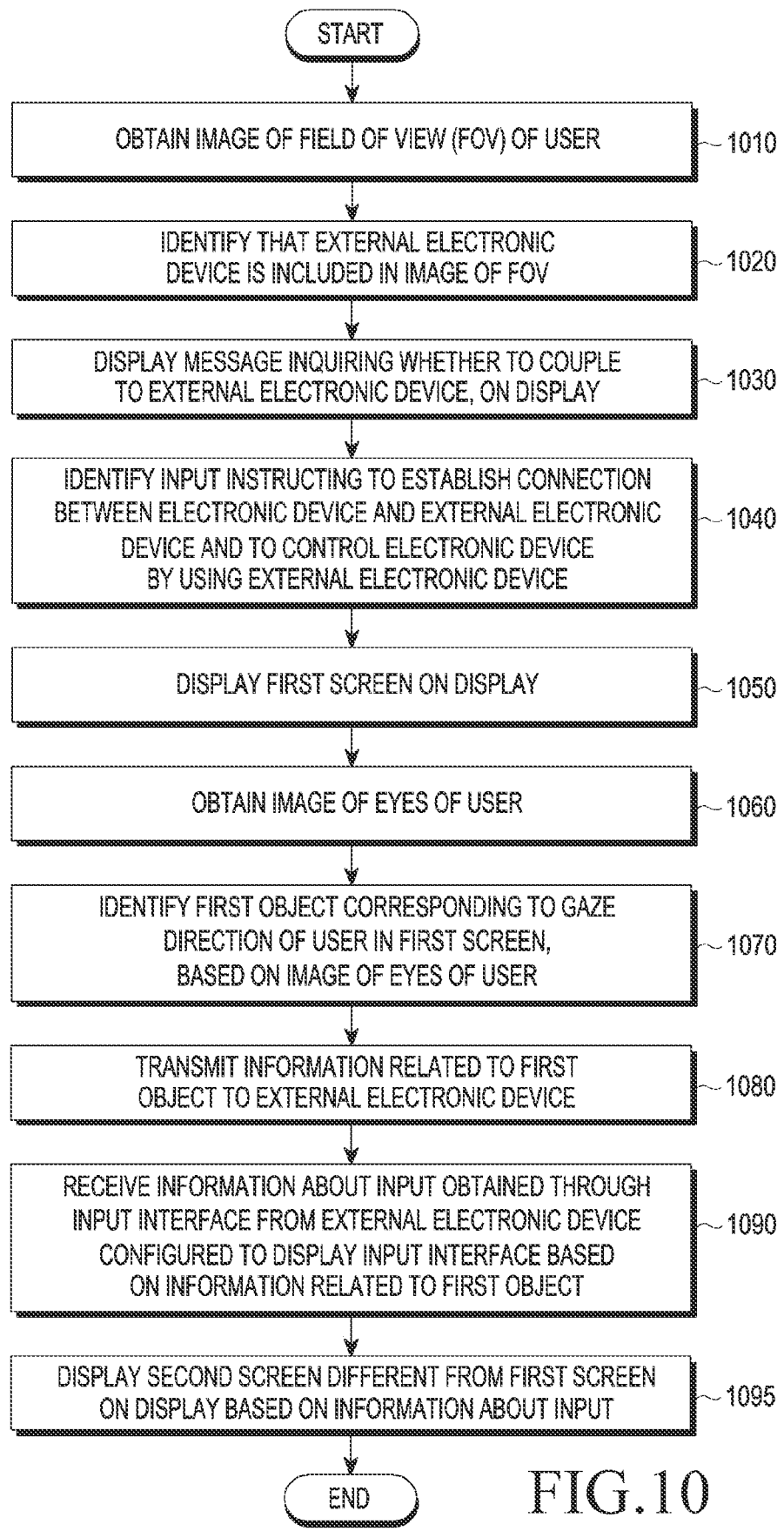
FIG. 10 is a flowchart illustrating operations performed by an AR device, according to an embodiment.

FIG. 10 is a flowchart illustrating operations performed by an AR device, according to an embodiment. At 1010, the processor 220 of the AR device 200 obtains an image of an FOV of a user. The processor 220 of the AR device 200 may obtain the image of the FOV of the user through at least one of the first cameras 211 or the third cameras 213.

At 1020, the processor 220 of the AR device 200 identifies that the external electronic device is included in the obtained image of the FOV of the user.

Figure 11:
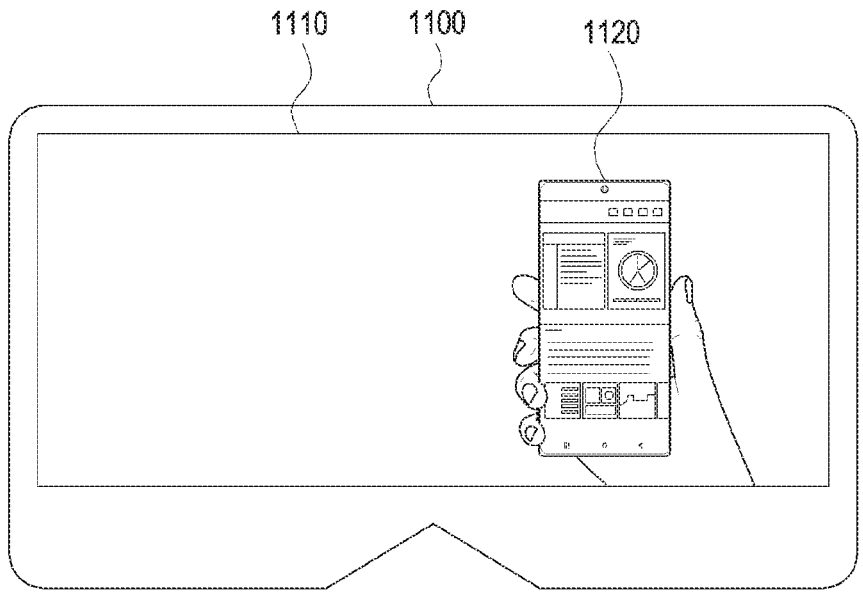
FIG. 11 is a diagram illustrating a field of view (FOV) of a user through an AR device, according to an embodiment.

FIG. 11 is a diagram illustrating an FOV of a user through an AR device, according to an embodiment. When an external electronic device 1120 is included in an FOV 1110 of a user through an AR device 1100, a processor of the AR device 1100 identifies that the external electronic device 1120 is included in the image of the FOV 1110 of the user obtained in operation 1010 by analyzing the image of the FOV 1110.

Referring back to FIG. 10, at 1030, the processor 220 of the AR device 200 displays a message inquiring whether the external electronic device is to be connected, on the display 250.

Figure 12:
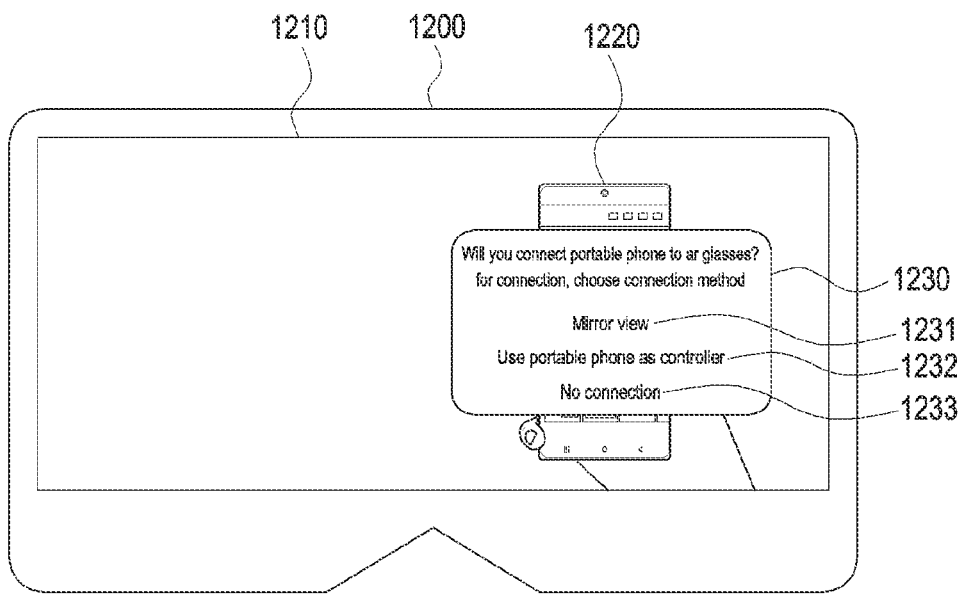
FIG. 12 is a diagram illustrating an FOV of a user through an AR device, according to an embodiment.

FIG. 12 is a diagram illustrating an FOV of a user through an AR device, according to an embodiment. When an external electronic device 1220 is included in an FOV 1210 of a user, an AR device 1200 displays a message 1230 inquiring whether the external electronic device 1220 is to be connected. The message 1230 may be displayed to overlap with the external electronic device 1220. When the external electronic device 1220 is moved within the FOV 1210 of the user, the message 1230 may also be moved along with the external electronic device 1220. The message 1230 includes an option 1231 for mirror view, an option 1232 to use a portable phone as a controller, and an option 1233 for no connection, as options for connection methods.

Referring back to FIG. 10, at 1040, the processor 220 of the AR device 200 identifies an input instructing to establish a connection between the AR device 200 and the external electronic device and to control the AR device 200 by using the external electronic device. As shown in FIG. 12, selection of the option 1232 to use a portable phone as a controller may be identified as an input instructing to establish a connection between the AR device 200 and the external electronic device and to control the AR device 200 by using the external electronic device.

Operations of the AR device 200 in the case of selecting the other two options 1231 and 1233 from among the three options displayed in the message 1230 are described in greater detail below.

At 1050, the processor 220 of the AR device 200 may display a first screen on the display 250. The above-described details of 410 of FIG. 4 may be applied to 1050 of FIG. 10.

Figure 13A:
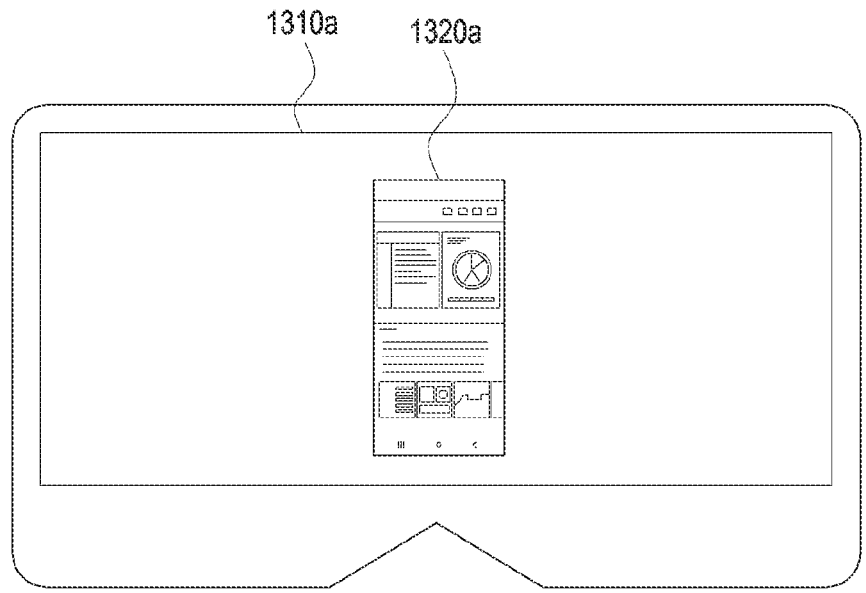
FIG. 13A is a diagram illustrating an FOV of a user through an AR device, according to an embodiment.

Examples of how the first screen is displayed are set forth below with reference to FIGS. 13A, 13B, 14A, and 14B. FIG. 13A is a diagram illustrating an FOV of a user through an AR device, according to an embodiment. Specifically, FIG. 13A illustrates an FOV 1310*a* of the user with a first screen 1320*a*. The first screen 1320*a* is an execution screen of an application running in the external electronic device before a connection is established between the AR device 200 and the external electronic device. The application corresponding to the first screen 1320*a* supports only a format for displaying the first screen 1310*a* on the external electronic device, like a mobile version, without supporting a format for displaying the first screen 1320*a* on the AR device 200.

Figure 13B:
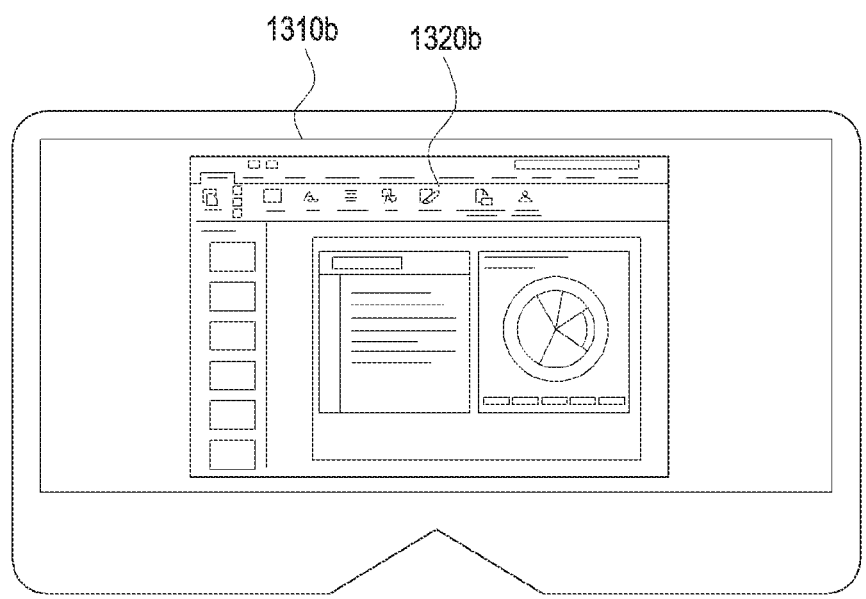
FIG. 13B is a diagram illustrating an FOV of a user through an AR device, according to an embodiment.

FIG. 13B is a diagram illustrating an FOV of a user through an AR device, according to an embodiment. Specifically, FIG. 13B illustrates an FOV 1310*b* of the user with a first screen 1320*b*. The first screen 1320*b* is an execution screen of an application running in the external electronic device before a connection is established between the AR device 200 and the external electronic device. The application corresponding to the first screen 1320*b* supports a format for displaying the first screen 1320*b* on the AR device 200. Compared to FIG. 13A in which the first screen 1320*a* is an execution screen of a mobile version, the first screen 1320*b* is displayed in a format to be displayed on the AR device in FIG. 13B.

Figure 14A:
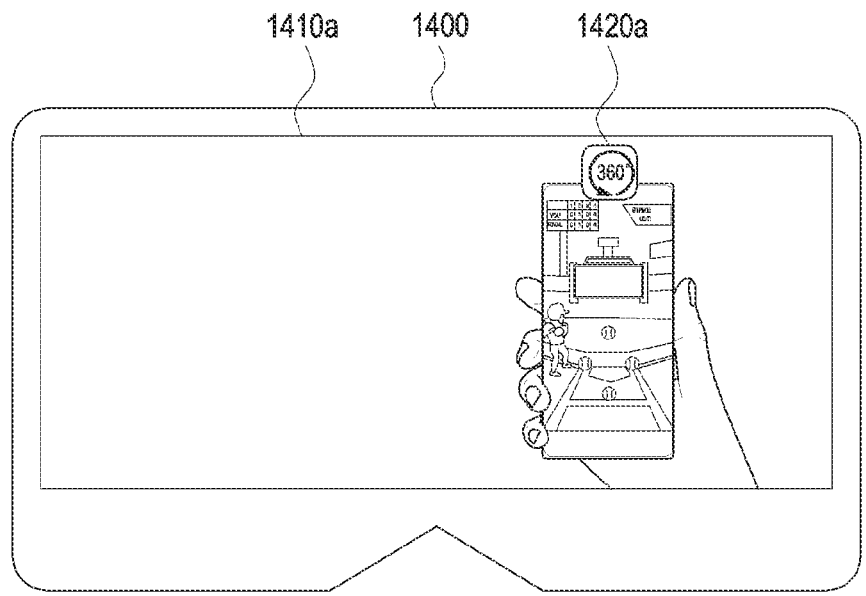
FIG. 14A is a diagram illustrating an FOV of a user through an AR device, according to an embodiment.

FIG. 14A is a diagram illustrating an FOV of a user through an AR device, according to an embodiment. Specifically, FIG. 14A illustrates an FOV 1410*a* of the user through an AR device 1400. The first screen is an execution screen of an application running in the external electronic device before a connection is established between the AR device 200 and the external electronic device. The application supports an immersive mode. Referring to FIG. 14A, when the application supports the immersive mode, the AR device 200 displays an interface 1420*a* indicating switching to the immersive mode on the display 250.

Figure 14B:
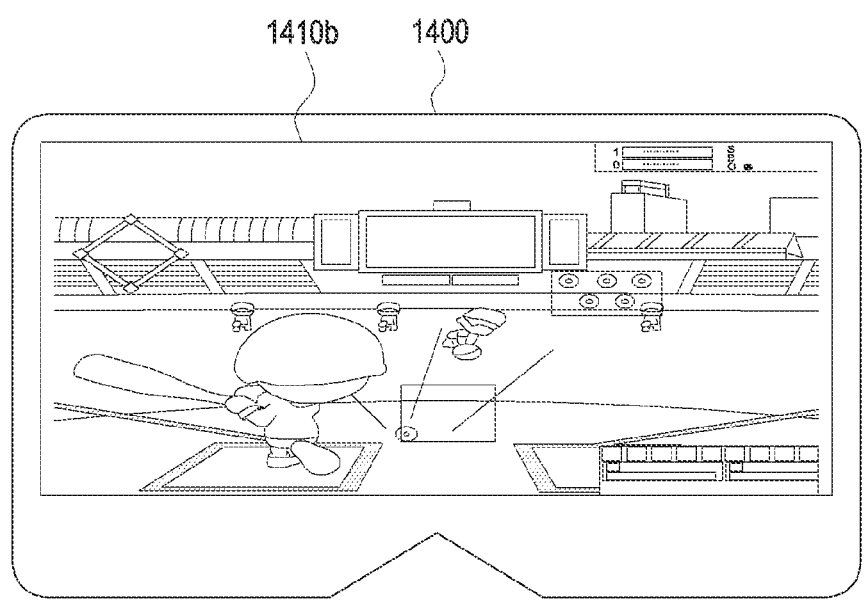
FIG. 14B is a diagram illustrating an FOV of a user through an AR device, according to an embodiment.

FIG. 14B is a diagram illustrating an FOV of a user through an AR device, according to an embodiment. Specifically, FIG. 14B illustrates an FOV 1410*b* of the user through the AR device 1400, when the interface 1420*a* is selected in FIG. 14A. Referring to FIG. 14B, the first screen may be displayed fully over the FOV 1410*b* of the user.

Referring back to FIG. 10, at 1060, the processor 220 of the AR device 200 obtains an image of the eyes of the user through at least the second camera 212. The above-described details of 420 of FIG. 4 may be equally applied to 1060 of FIG. 10.

At 1070, the processor 220 of the AR device 200 identifies a first object corresponding to a gaze direction of the user in the first screen, based on the obtained image of the eyes of the user.

At 1080, the processor 220 of the AR device 200 transmits information related to the identified first object to the external electronic device. The above-described details of 440 of FIG. 4 may be equally applied to 1080 of FIG. 10.

At 1090, the processor 220 of the AR device 200 receives information about an input obtained through an input interface of the external electronic device from the external electronic device through the communication circuit 270. The above-described details of 450 of FIG. 4 may be equally applied to 1090 of FIG. 10. At 1095, the processor 220 of the AR device 200 displays a second screen, which is different from the first screen, on the display 250 based on the received input. The above-described details of 460 of FIG. 4 may be equally applied to 1095 of FIG. 10.

While an operation of obtaining an image of an FOV of a user and identifying that an external electronic device is included in the image of the FOV has been described in 1010 and 1020 of FIG. 10, the AR device 200 may prompt the user to determine whether to establish a connection between the external electronic device and the AR device 200 in response to a different condition being satisfied instead of 1010 and 1020. The AR device 200 may perform 1030 in response to the fact that the distance between the external electronic device and the AR device 200 is less than a predetermined distance.

With reference to FIG. 10, only an operation performed in the case of selecting the option 1232 to use a portable phone as a controller from among the three options displayed in the message 1230 of FIG. 12 has been descried. When the option 1231 for mirror view is selected from among the three options displayed in the message 1230 of FIG. 12, the AR device 200 may display the same screen as that displayed on the external electronic device on the display 250. When the option 1233 for no connection is selected from among the three options displayed in the message 1230 of FIG. 12, the AR device 200 may not establish a connection with the external electronic device, ignoring the external electronic device.

Figure 15:
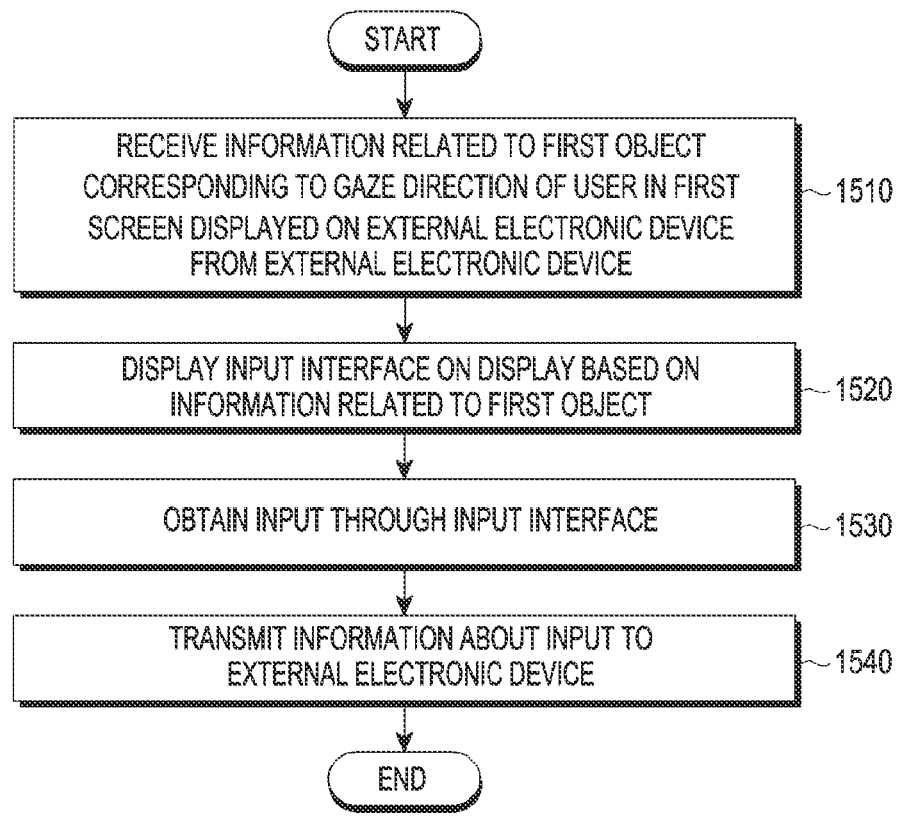
FIG. 15 is a flowchart illustrating operations performed by an electronic device interacting with an AR device, according to an embodiment.

FIG. 15 is a flowchart illustrating operations performed by an electronic device interacting with an AR device, according to an embodiment. At 1510, the processor 320 of the external electronic device receives information related to a first object corresponding to a gaze direction of a user on a first screen displayed on the AR device 200, from the AR device 200 through the communication module 190. Details on the information related to the first object are provided with reference to 440 of FIG. 4 above.

At 1520, the processor 320 of the external electronic device displays an input interface based on the information related to the first object on the display module 360. Details on an input interface are provided with reference to the description of FIGS. 5A to 9 above.

At 1530, the processor 320 of the external electronic device obtains an input through the input interface.

At 1540, the processor 320 of the external electronic device transmits information about the input to the AR device 200 through the communication module 190. Details on the information about the input are provided with reference to the description of 450 of FIG. 4 above.

An electronic device is provided that includes a display, at least one camera, a communication circuit, and at least one processor. The at least one processor is configured to display a first screen on the display, obtain an image of an eye of a user of the electronic device through the at least one camera, and identify a first object in the first screen corresponding to a gaze direction of the user based on the image of the eye of the user. The at least one processor is also configured to transmit information related to the first object to an external electronic device through the communication circuit. The external electronic device is configured to display an input interface based on the information related to the first object. The at least one processor is further configured to receive, from the external electronic device through the communication circuit, information about an input obtained through the input interface, and display, on the display, a second screen that is different from the first screen, based on the information about the input.

The first information related to the first object may indicate coordinates of the first object on the first screen.

The first information related to the first object may indicate a type of the input interface corresponding to the first object.

The input interface may include a trackpad input interface.

The input interface may include a setting change interface for changing a setting related to an operation of the electronic device.

The first object may be related to a text input, and the input interface may include a keypad.

The input interface may include an option input interface displaying a plurality of options related to the first object.

The at least one processor may be further configured to receive sensor information related to at least one sensor of the external electronic device from the external electronic device through the communication circuit, and identify the second screen based on the sensor information.

The at least one processor is further configured to obtain a FOV image of the user through the at least one camera, and display a message inquiring whether to couple the electronic device to the external electronic device on the display in response to the external electronic device being included in the FOV image.

The at least one processor may be further configured to identify, through the communication circuit, that a distance between the external electronic device and the electronic device is less than a predetermined distance, and display, on the display a message inquiring whether to control the display by using the external electronic device in response to the distance between the external electronic device and the electronic device being identified as less than the predetermined distance.

An electronic device is provided that includes a display, a communication circuit, and at least one processor. The at least one processor is configured to receive, from an external electronic device through the communication circuit, first information related to a first object corresponding to a gaze direction of a user of an external electronic device, in a first screen displayed on the external electronic device. The at least one processor is also configured to display, on the display, an input interface based on the information related to the first object, obtain an input through the input interface, and transmit second information about the input to the external electronic device.

The first information related to the first object may indicate coordinates of the first object in the first screen.

The first information related to the first object may indicate a type of the input interface corresponding to the first object.

The input interface may include a trackpad input interface.

The input interface may include a setting change interface for changing a setting related to an operation of the external electronic device.

The first object may be related to a text input, and the input interface may include a keypad.

The input interface may include an option input interface displaying a plurality of options related to the first object.

The input interface may include an indicator indicating at least one of a plurality of numbers or amounts related to the first object.

A method of controlling a first electronic device and a second electronic device is provided. A first screen is displayed on a first display of the first electronic device. An image of an eye of a user of the first electronic device is obtained. A first object in the first screen corresponding to a gaze direction of the user is identified based on the image of the eye of the user. An input interface is displayed on a second display of the second electronic device based on a type of the first object. A second screen that is different from the first screen is displayed on the first display of the first electronic device, based on a first input obtained through the input interface.

The method may further include displaying, on the first display, a message inquiring whether to establish a connection between the first electronic device and the second electronic device, and identifying a second input instructing to establish the connection between the first electronic device and the second electronic device and to control the first electronic device by using the second electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and detail may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a display;
   at least one camera;
   a communication circuit; and
   at least one processor,
   wherein the at least one processor is configured to:
   display a first screen on the display;
   obtain an image of an eye of a user of the electronic device through the at least one camera;
   identify a first object in the first screen corresponding to a gaze direction of the user, based on the image of the eye of the user;
   transmit, to an external electronic device through the communication circuitry, first information triggering display of an input interface for obtaining an input related to the first object at the external electronic device;
receive, from the external electronic device, through the communication circuit, second information about the input obtained through the input interface; and
display, on the display, a second screen that is different from the first screen, based on the second information about the input.

2. The electronic device of claim 1, wherein the first information related to the first object indicates coordinates of the first object on the first screen.

3. The electronic device of claim 1, wherein the first information related to the first object indicates a type of the input interface corresponding to the first object.

4. The electronic device of claim 1, wherein the input interface comprises a trackpad input interface.

5. The electronic device of claim 1, wherein the input interface comprises a setting change interface for changing a setting related to an operation of the electronic device.

6. The electronic device of claim 1, wherein the first object is related to a text input, and the input interface comprises a keypad.

7. The electronic device of claim 1, wherein the input interface comprises an option input interface displaying a plurality of options related to the first object.

8. The electronic device of claim 1, wherein the at least one processor is further configured to:
receive sensor information related to at least one sensor of the external electronic device from the external electronic device through the communication circuit; and
identify the second screen based on the sensor information.

9. The electronic device of claim 1, wherein the at least one processor is further configured to:
obtain a field of view (FOV) image of the user through the at least one camera; and
display a message inquiring whether to couple the electronic device to the external electronic device on the display in response to the external electronic device being included in the FOV image.

10. The electronic device of claim 1, wherein the at least one processor is further configured to:
identify, through the communication circuit, that a distance between the external electronic device and the electronic device is less than a predetermined distance, and
display, on the display, a message inquiring whether to control the display by using the external electronic device, in response to the distance between the external electronic device and the electronic device being identified as less than the predetermined distance.

11. An electronic device comprising:
a display;
a communication circuit; and
at least one processor,
wherein the at least one processor is configured to:
receive first information related to a first object corresponding to a gaze direction of a user of an external electronic device, in a first screen displayed on the external electronic device, from the external electronic device through the communication circuit;
display, on the display, an input interface for obtaining an input related to the first object based on the information related to the first object;
obtain the input related to the first object through the input interface; and
transmit second information about the input to the external electronic device.

12. The electronic device of claim 11, wherein the first information related to the first object indicates coordinates of the first object on the first screen.

13. The electronic device of claim 11, wherein the first information related to the first object indicates a type of the input interface corresponding to the first object.

14. The electronic device of claim 11, wherein the input interface comprises a trackpad input interface.

15. The electronic device of claim 11, wherein the input interface comprises a setting change interface for changing a setting related to an operation of the external electronic device.

16. The electronic device of claim 11, wherein the first object is related to a text input, and the input interface comprises a keypad.

17. The electronic device of claim 11, wherein the input interface comprises an option input interface displaying a plurality of options related to the first object.

18. The electronic device of claim 11, wherein the input interface comprises an indicator indicating at least one of a plurality of numbers or amounts related to the first object.

19. A method of controlling a first electronic device and a second electronic device, the method comprising:
displaying a first screen on a first display of the first electronic device;
obtaining an image of an eye of a user of the first electronic device;
identifying a first object in the first screen corresponding to a gaze direction of the user, based on the image of the eye of the user;
displaying an input interface for obtaining a first input related to the first object based on a type of the first object on a second display of the second electronic device; and
displaying, on the first display, a second screen that is different from the first screen, based on the first input obtained through the input interface.

20. The method of claim 19, further comprising:
displaying, on the first display, a message inquiring whether to establish a connection between the first electronic device and the second electronic device; and
identifying a second input instructing to establish the connection between the first electronic device and the second electronic device and to control the first electronic device by using the second electronic device.

* * * * *